United States Patent
Gore

(10) Patent No.: US 12,409,623 B1
(45) Date of Patent: Sep. 9, 2025

(54) SYSTEMS AND METHODS FOR TIRE PRESS TEMPERATURE CONTROL WITH ARTIFICIAL INTELLIGENCE

(71) Applicant: Teddy Lee Gore, Paris, TN (US)

(72) Inventor: Teddy Lee Gore, Paris, TN (US)

(73) Assignee: Paris Industrial Services, Inc., Paris, TN (US)

( * ) Notice: Subject to any disclaimer, the term of this patent is extended or adjusted under 35 U.S.C. 154(b) by 0 days.

(21) Appl. No.: 17/933,269

(22) Filed: Sep. 19, 2022

(51) Int. Cl.
*B29D 30/06* (2006.01)

(52) U.S. Cl.
CPC .. *B29D 30/0662* (2013.01); *B29D 2030/0666* (2013.01); *B29D 2030/0675* (2013.01)

(58) Field of Classification Search
CPC ........ B29D 30/0662; B29D 2030/0666; B29D 2030/0675
USPC ....................................... 264/40.1
See application file for complete search history.

(56) References Cited

U.S. PATENT DOCUMENTS

| | | | |
|---|---|---|---|
| 3,640,653 A | 2/1972 | Laenen et al. |
| 3,794,457 A | 2/1974 | Gazuit |
| 4,502,857 A | 3/1985 | Hinks |
| 4,744,931 A | 5/1988 | Trapp |
| 4,779,206 A | 10/1988 | Mattson et al. |
| 5,019,318 A | 5/1991 | Mattson |
| 5,256,348 A | 10/1993 | Waller |
| 5,522,716 A | 6/1996 | Ureshino |
| 6,508,896 B1 | 1/2003 | Jao et al. |
| 6,841,102 B2 | 1/2005 | Cole |
| 7,001,559 B2 | 2/2006 | Dobayashi et al. |
| 7,987,697 B2 | 8/2011 | Pickel |
| 8,366,426 B2 | 2/2013 | Singh et al. |
| 9,108,374 B2 | 8/2015 | Rodgers et al. |
| 10,022,928 B2 | 7/2018 | Satrape et al. |
| 11,020,881 B2 | 6/2021 | Gore |
| 2006/0260735 A1 | 11/2006 | Mancini |

FOREIGN PATENT DOCUMENTS

KR 2013026672 A * 3/2013

* cited by examiner

*Primary Examiner* — Jeffrey M Wollschlager
*Assistant Examiner* — Xue H Liu
(74) *Attorney, Agent, or Firm* — Holland & Knight LLP; Matthew C. Cox; Forrest S. Tinnin

(57) ABSTRACT

A system for operating a tire press may include a control valve in fluid communication with a source of heated fluid, the tire press, a temperature sensor configured to measure a temperature in the tire press, and a programmable logic controller connected to the control valve and in data communication with the temperature sensor. The controller may be configured to receive a temperature reading from the temperature sensor and provide an output to operate the control valve during a first duty cycle of the tire press to achieve a set point in the tire press during the first duty cycle, input, into a temperature control module, a performance parameter based on a position of the control valve and the temperature reading, and determine the output to operate the control valve for a subsequent duty cycle based on an output of the temperature control module.

11 Claims, 4 Drawing Sheets

Operating, based on the temperature reading, the control valve during a first duty cycle of the tire press to achieve a set point in the tire press during the first duty cycle
310

Inputting, into a temperature control module, a performance parameter based on a position of the control valve and the temperature reading
312

Determining, at the programmable logic controller, an output to operate the control valve for a subsequent duty cycle based on an output of the temperature control module
314

FIG. 3B

SYSTEMS AND METHODS FOR TIRE PRESS TEMPERATURE CONTROL WITH ARTIFICIAL INTELLIGENCE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

BACKGROUND OF THE DISCLOSURE

The present disclosure generally relates to tire manufacturing, and more particularly to systems and methods for tire press temperature control with artificial intelligence.

In conventional tire manufacturing, a tire press is heated, either directly in the mold or through a platen. The mold or platen contains galleys, which receive steam or heated oil and heat the mold or platen. The mold or platen has a desired temperature at which the mold or platen should be at during the tire curing process. This desired temperature is called the "set point." Unfortunately, it is difficult for the mold or platen to remain at the set point because various activities during the tire manufacturing process cause heat to escape from the mold or platen. Such activities can include opening the tire press.

A control system can use control valves to attempt to control the flow of the steam or heated oil in order to increase or decrease the temperature of the mold or platen. Conventional control systems have a feedback loop that determines the temperature of the mold or platen and then opens or closes control valves to adjust the temperature to the set point. However, such systems can be inaccurate and can take a long time to reach the set point. For example, in response to the mold's or platen's temperature being below the set point, the control system may open a control valve to release more steam or heated oil to increase the temperature. However, by the time the control system determines that the mold or platen has reached the set point, the control valves may have released too much steam or oil, causing the temperature to continue to rise beyond the set point. The control system must then close the valves, causing the temperature to decrease. This process may continue until the mold or platen reaches an equilibrium at the set point.

What is needed, then, are systems and methods for tire press temperature control with artificial intelligence.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is a system for operating a tire press. The system may include a control valve in fluid communication with a source of heated fluid. The system may include the tire press. The tire press may include a mold and/or a bladder. The tire press may include one or more galleys. Each galley may be in fluid communication with the source of heated fluid. The system may include a temperature sensor configured to measure a temperature in the tire press. The system may include a programmable logic controller connected to the control valve and in data communication with the temperature sensor. The controller may be configured to receive a temperature reading from the temperature sensor and provide an output to operate the control valve during a first duty cycle of the tire press to achieve a set point in the tire press during the first duty cycle. The controller may be configured to input, into a temperature control module, a performance parameter based on a position of the control valve and the temperature reading. The controller may be configured to determine the output to operate the control valve for a subsequent duty cycle based on an output of the temperature control module.

Another aspect of the disclosure includes another system for operating a tire press. The system may include the tire press, including a mold and/or a bladder and a heating element. The system may include a temperature sensor configured to measure a temperature of the tire press. The system may include a programmable logic controller connected to the heating element and in data communication with the temperature sensor. The controller may be configured to receive a temperature reading from the temperature sensor and provide an output to operate the heating element during a first duty cycle of the tire press to achieve a set point in the tire press during the first duty cycle. The controller may be configured to input, into a temperature control module, a performance parameter based on a configuration of the heating element and the temperature reading. The controller may be configured to determine the output to operate the heating element for a subsequent duty cycle based on an output of the temperature control module.

Another aspect of the disclosure is a method for controlling the temperature of a tire press. The method may include introducing a tire into a mold or bladder of the tire press. The tire press may include one or more galleys. Each galley of the one or more galleys may be in fluid communication with a source of heated fluid. The method may include heating, via the heated fluid, the tire in the mold. The method may include measuring, via a temperature sensor, a temperature in the tire press. The method may include sending a temperature reading based on the measured temperature to a programmable logic controller connected to a control valve and in data communication with the temperature sensor. The method may include operating, based on the temperature reading, the control valve during a first duty cycle of the tire press to achieve a set point in the tire press during the first duty cycle. The method may include inputting, into a temperature control module, a performance parameter based on a position of the control valve and the temperature reading. The method may include determining, at the programmable logic controller, an output to operate the control valve for a subsequent duty cycle based on an output of the temperature control module.

Numerous other objects, advantages and features of the present disclosure will be readily apparent to those of skill in the art upon a review of the following drawings and description of various embodiments.

BRIEF DESCRIPTION OF THE DRAWINGS

FIG. 3B is a flowchart illustrating a continuation of the embodiment of the method for tire press temperature control of FIG. 3A.

DETAILED DESCRIPTION

Figure 1:
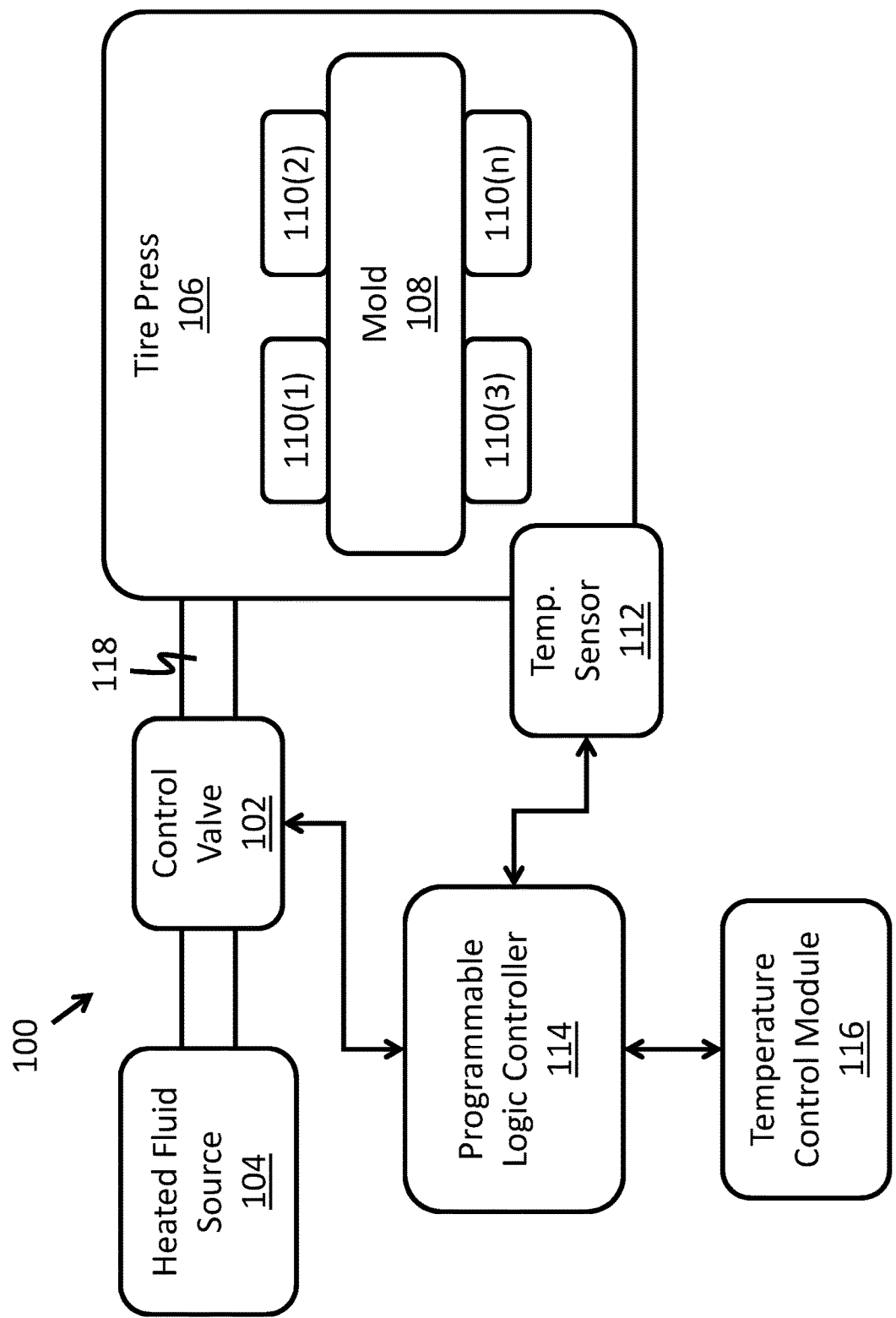
FIG. 1 is a schematic block diagram illustrating one embodiment of a system for tire press temperature control.

While the making and using of various embodiments of the present disclosure are discussed in detail below, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatus and methods described herein. Such equivalents are considered to be within the scope of this disclosure and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Reference throughout this specification to "one embodiment," "an embodiment," "another embodiment," or similar language means that a particular feature, structure, or characteristic described in connection with the embodiment is included in at least one embodiment. Thus, appearances of the phrases "in one embodiment," "in an embodiment," "in some embodiments," and similar language throughout this specification may, but do not necessarily, all refer to the same embodiment, but mean "one or more but not necessarily all embodiments" unless expressly specified otherwise.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. As used herein, the term "a," "an," or "the" means "one or more" unless otherwise specified. The term "or" means "and/or" unless otherwise specified.

Multiple elements of the same or a similar type may be referred to as "Elements 102(1)-(n)" where n may include a number. Referring to one of the elements as "Element 102" refers to any single element of the Elements 102(1)-(n). Additionally, referring to different elements "First Elements 102(1)-(n)" and "Second Elements 104(1)-(n)" does not necessarily mean that there must be the same number of First Elements as Second Elements and is equivalent to "First Elements 102(1)-(n) and "Second Elements (1)-(m)" where m is a number that may be the same or may be a different number than n.

As used herein, the term "computing device" may include a desktop computer, a laptop computer, a tablet computer, a mobile device such as a mobile phone or a smart phone, a smartwatch, a gaming console, an application server, a database server, or some other type of computing device. A computing device may include a physical computing device or may include a virtual machine (VM) executing on another computing device. A computing device may include a cloud computing system, a distributed computing system, or another type of multi-device system.

As used herein, the term "data network" may include a local area network (LAN), wide area network (WAN), the Internet, or some other network. A data network may include one or more routers, switches, repeaters, hubs, cables, or other data communication components. A data network may include a wired connection or a wireless connection.

As used herein, the terms "determine" or "determining" may include a variety of actions. For example, "determining" may include calculating, computing, processing, deriving, looking up (e.g., looking up in a table, a database or another data structure), ascertaining, or other actions. Also, "determining" may include receiving (e.g., receiving information or data), accessing (e.g., accessing data in a memory, data storage, distributed ledger, or over a network), or other actions. Also, "determining" may include resolving, selecting, choosing, establishing, or other similar actions.

As used herein, the terms "provide" or "providing" may include a variety of actions. For example, "providing" may include generating data, storing data in a location for later retrieval, transmitting data directly to a recipient, transmitting or storing a reference to data, or other actions. "Providing" may also include encoding, decoding, encrypting, decrypting, validating, verifying, or other actions.

As used herein, the term "access," "accessing", and other similar terms may include a variety of actions. For example, accessing data may include obtaining the data, examining the data, or retrieving the data. Providing access or providing data access may include providing confidentiality, integrity, or availability regarding the data.

As used herein, the term "modify" or "modifying" may include several actions. For example, modifying data may include adding additional data or changing the already-existing data. As used herein, the term "obtain" or "obtaining" may also include several types of action. For example, obtaining data may include receiving data, generating data, designating data as a logical object, or other actions.

FIG. 1 depicts one embodiment of a system 100. The system 100 may include a system for operating a tire press. As a general overview, the system 100 may include a control valve 102. The control valve 102 may be in fluid communication with a source of heated fluid 104 (sometimes called the "heated fluid source 104"). The system 100 may include a tire press 106. The tire press 106 may include a mold 108 and a bladder. The tire press 106 may include one or more galleys 110(1)-(n). Each galley 110 may be in fluid communication with the source of heated fluid 104. The system 100 may include a temperature sensor 112. The temperature sensor 112 may be configured to measure a temperature in the tire press 106.

The system 100 may include a programmable logic controller 114 (sometimes called the "controller 114"). The controller 114 may be connected to the control valve 102. The controller 114 may be in data communication with the temperature sensor 112. The controller 114 may be configured to receive a temperature reading from the temperature sensor 112. The controller 114 may be configured to provide an output to operate the control valve 102 during a first duty cycle of the tire press 106 to achieve a set point in the tire press 106 during the first duty cycle. The controller 114 may be configured to input, into a temperature control module 116, a performance parameter based on a position of the control valve 102 or the temperature reading. The controller 114 may be configured to determine the output to operate the control valve 102 for a subsequent duty cycle based on an output of the temperature control module 116.

Thus, in one embodiment, the system 100 may examine data—such as control valve 102 position, temperature, or other data—from previous duty cycles and use such data as input to the temperature control module 116. The temperature control module 116 may help calculate the position of the control valve 102 should be at for one or more parts of the tire curing process. The system 100 may use the data to adjust the temperature of the tire press 106 more efficiently and go beyond the conventional feedback loop that only uses the current control valve 102 position and the current temperature.

The temperature control module 116 may output data that helps determine the position the control valve 102 should be in during one or more points in a subsequent duty cycle in order to keep the tire press 106 at the set point even if the tire press 106 experiences temperature fluctuations, for example, due to opening and closing the tire press 106.

Further details regarding the system 100 are now disclosed. In one embodiment, the control valve 102 may control the flow of a heated fluid. The heated fluid may include steam, heated oil, or some other heated fluid. The control valve 102 may include an electrical, hydraulic, pneumatic, or some other type of actuator. The control valve 102 may modulate between a fully closed position and a fully open position. The control valve 102 may include a degree of opening. Thus, the act of "opening" the control valve 102 may include opening the control valve 102 to a more open degree, but not necessarily to a fully open position. Similarly, "closing" the control valve 102 may include closing the control valve 102 to a more closed degree, but not necessarily to a fully closed position. In some embodiments, the more open the control valve's 102 position is, the more heated fluid may flow through the control valve 102, the control valve 102 may experience a higher rate of flow, etc. More heated fluid flowing through the control valve 102 or a higher rate of flow may result in the tire press 106 being heated more by the heated fluid and, thus, experiencing an increase in temperature. Conversely, the more closed the control valve's 102 position, the less the heated fluid may flow through the control valve 102 or the lower the rate of flow, which may result in a decrease in temperature of the tire press 106.

In some embodiments, the source of heated fluid 104 may include a reservoir of steam, heated oil, or other heated fluid. The heated fluid source 104 may be in fluid communication with the tire press 106 via a channel 118. The channel 118 may include a tube, pipe, or other fluid delivery structure. The control valve 102 may be disposed on the channel 118, in the tire press 106, or in some other location such that the control valve 102 may control the flow of the heated fluid from the source of heated fluid 104 to the tire press 106.

In one or more embodiments, the tire press 106 may include a machine configured to receive a tire. The tire may include an unfinished tire that may need to go through one or more finishing processes. For example, the tire may include an uncured tire (sometimes called a "green tire"). In some embodiments, the tire press 106 may be configured to receive the tire in a horizontal orientation (i.e., the side walls of the tire face upward or downward) or a vertical orientation.

In certain embodiments, the tire press 106 may include a mold 108 and a bladder. The mold 108 may cure the tire by applying pressure and heat to the tire in the mold 108 such that the heat and pressure may activate one or more chemical reactions in the rubber compounds and other materials of the tire to finish the tire. The mold 108 may include one or more galleys 110(1)-(n). A galley 110 may include a space or area that contains the heated fluid in order to apply the heat to mold 108 or bladder during the tire curing process. In some embodiments, heat is controlled in the mold. In further embodiments, heat is controlled in the bladder with heating elements. In additional embodiments, heat is controlled in both the mold and the bladder with heating elements.

In some embodiments, the tire press 106 may include a platen. A platen may include a flat plate disposed in the tire press 106. One or more of the one or more galleys 110(1)-(n) may be disposed in the platen. The one or more galleys 110(1)-(n) may heat the platen, which may, in turn, apply heat to the tire in the tire press 106. In some embodiments, the tire press 106 may include multiple platens. For example, the tire press 106 may include a top platen and a bottom platen. The top platen may apply heat to one side of the mold 108, and the bottom platen may apply heat to another side of the mold 108.

In one embodiment, the temperature sensor 112 may include a mechanical temperature sensor, an electrical temperature sensor, an integrated circuit (IC) sensor, or some other type of temperature sensor. The temperature sensor 112 may include a thermometer, a resistance thermometer, a therm, a thermistor, a thermocouple, an analog or digital IC sensor, or other temperature-sensing equipment. The temperature sensor 112 may sense the temperature of the tire press 106. In one embodiment, the temperature of the tire press 106 may include a temperature of the mold 108 and bladder. The temperature of the tire press 106 may include a temperature of the platen.

Although not shown in FIG. 1, in one or more embodiments, the system 100 may include a fluid outtake. The fluid outtake may include a channel where the heated fluid may flow out of the tire press 106. The fluid outtake may allow heated fluid that has cooled to exit the tire press 106 so that heated fluid from the heated fluid source 104 can enter the tire press 106. In some embodiments, the fluid outtake may carry the cooled heated fluid to a location where the cooled heated fluid can be reheated and then reintroduced to the heated fluid source 104. In some embodiments, the heated fluid source 104 may include the location where the cooled fluid is reheated.

In one embodiment, the programmable logic controller 114 may include a computing device. The controller 114 may be in data communication with the temperature sensor 112. For example, the controller 114 and the temperature sensor 112 may be connected via a data network, a cable, a wire, or other data communication manner. The temperature sensor 112 may send a temperature reading to the controller 114. The temperature reading may include the temperature of the tire press 106. The controller 114 may use the temperature reading to adjust the control valve 102 and, thus, the temperature of the tire press 106.

In some embodiments, temperature control module 116 may include software or hardware. The temperature control module 116 may include software that executes on the controller 114 or on another computing device in data communication with the controller 114. The temperature control module 116 may include a circuit, such as an application-specific integrated circuit (ASIC) disposed on the controller 114 or in data communication with the controller 114. The temperature control module 116 may be configured to receive a performance parameter based on a position of the control valve 102 or the temperature reading from the temperature sensor 112 and combine such data with other, previous control valve 102 positions or temperature readings.

In some embodiments, the temperature control module 116 may include an artificial intelligence (AI) model. The AI model may include an artificial neural network (ANN)

(including a deep learning ANN, a convolutional neural network, or other type of ANN), a decision tree, a support-vector machine (SVM), regression analysis, a Bayesian network, a genetic algorithm, or some other type of AI model.

In one embodiment, the set point may include the desired temperature of the tire press 106. In one embodiment, the set point may include a temperature between 395 and 400 degrees Fahrenheit (approx. 201.7 and 204.4 degrees Celsius). However, the set point may be below 395 degrees, above 400 degrees, or fall within some other temperature range.

In some embodiments, a duty cycle may include a length of time during which the temperature sensor 112 may take a temperature reading and the controller 114 may adjust the control valve's 102 position in order to increase or decrease the temperature in the tire press 106 so that the temperature will arrive at or stay at the set point. The tire curing process may include one or more sequential duty cycles. The tire curing process may include duty cycles that immediately follow one another or may include duty cycles interspersed with periods of inactivity. In some embodiments, a duty cycle may include a length of time of at least 3 seconds, 1 second, 2 seconds, 3 seconds, 4 seconds, 5 seconds, 10 seconds, 20 seconds, 30 seconds, 1 minute, 2 minutes, 3 minutes, 5 minutes, or some other length of time. The length of time of the tire curing process for a single tire may include approximately 15 minutes.

Figure 2:
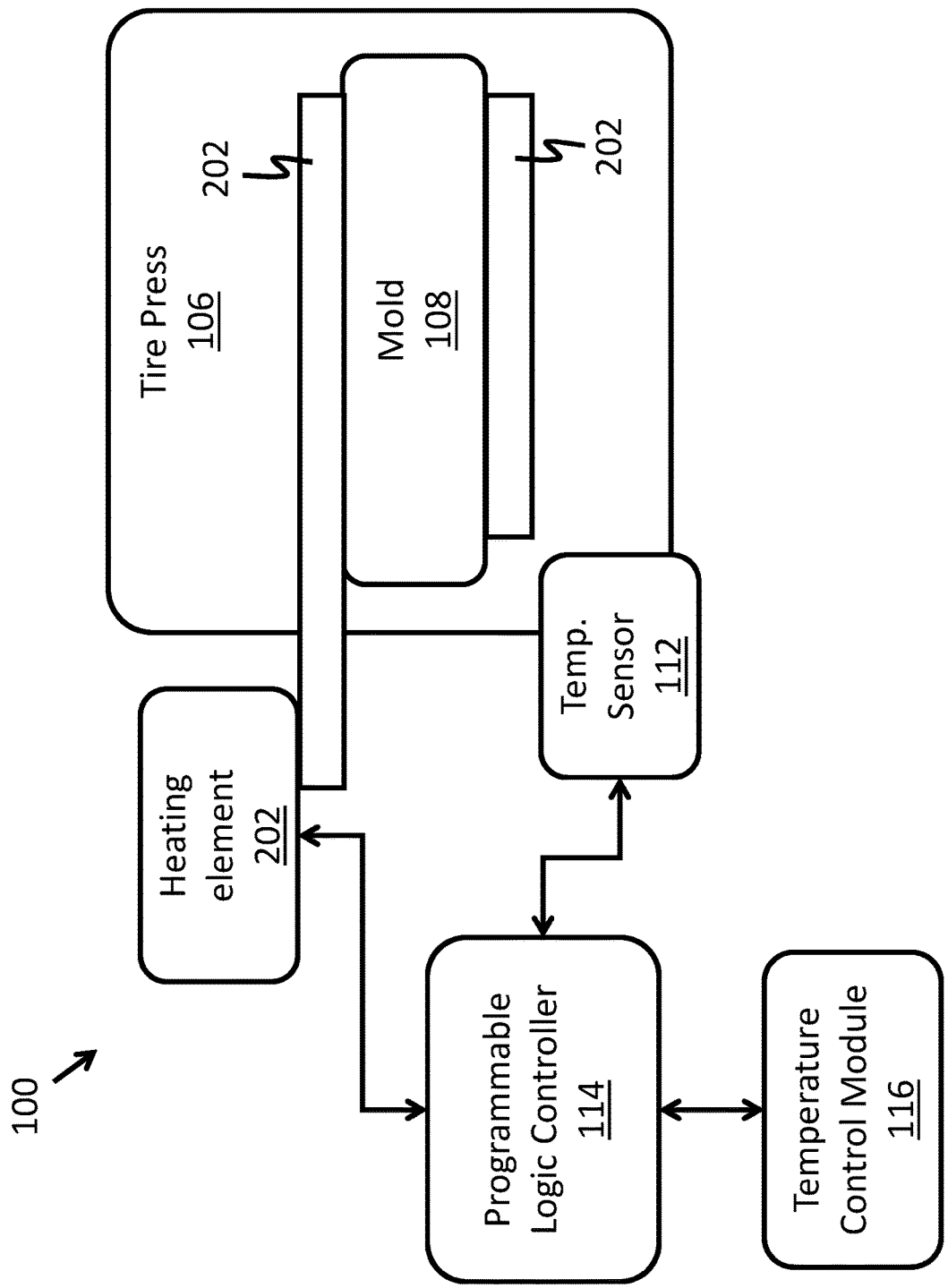
FIG. 2 is a schematic block diagram illustrating another embodiment of a system for tire press temperature control.

FIG. 2 depicts another embodiment of the system 100. The system 100 may include several components described above in relation to the system 100 of FIG. 1. For example, the system 100 may include the tire press 106, the mold 108, the temperature sensor 112, the programmable logic controller 114, or the temperature control module 116.

The system 100 may include a heating element 202. In one embodiment, the heating element 202 may include components from the control valve 102, the heated fluid source 104, the one or more galleys 110(1)-(n), the channel 118 (such as a channel that carries heated oil), the platen, or other components from the system 100 of FIG. 1. In certain embodiments, the heating element 202 may include a direct heating system. The direct heating system may include a wire, an induction coil, or other components that may generate heat directly within a material by passing electric current through the material. In some embodiments, the heating element 202 may be at least partially disposed within the tire press 106. A portion of the heating element 202 may be disposed around the mold 108 to apply heat to the mold 108. Alternatively, the heating element may be configured to control heat in a bladder. In one embodiment, the heating element 202 may be at least partially disposed in a platen.

In one embodiment, the controller 114 may be configured to receive a temperature reading from the temperature sensor 112. The controller 114 may provide an output to operate the heating element 202 during a first duty cycle of the tire press 106 to achieve a set point in the tire press 106 during the first duty cycle. Operating the heating element may include passing electric current through the heating element 202 in order to heat up the heating element 202, ceasing to pass electric current through the heating element 202 in order to cool the heating element 202, or some other operation. Where the heating element 202 may include heated oil, operating the heating element 202 may include heating oil in an oil channel.

The controller 114 may be further configured to input, into the temperature control module 116, a performance parameter based on a configuration of the heating element 202 and the temperature reading. The configuration of the heating element 202 may include a position of a control valve 102 (for example, where the heating element 202 includes heated oil or steam), a temperature at which the direct electric heating element is set, or other configurations. The controller 114 may be further configured to determine the output to operate the heating element 202 for a subsequent duty cycle based on an output of the temperature control module 116.

Figure 3A:
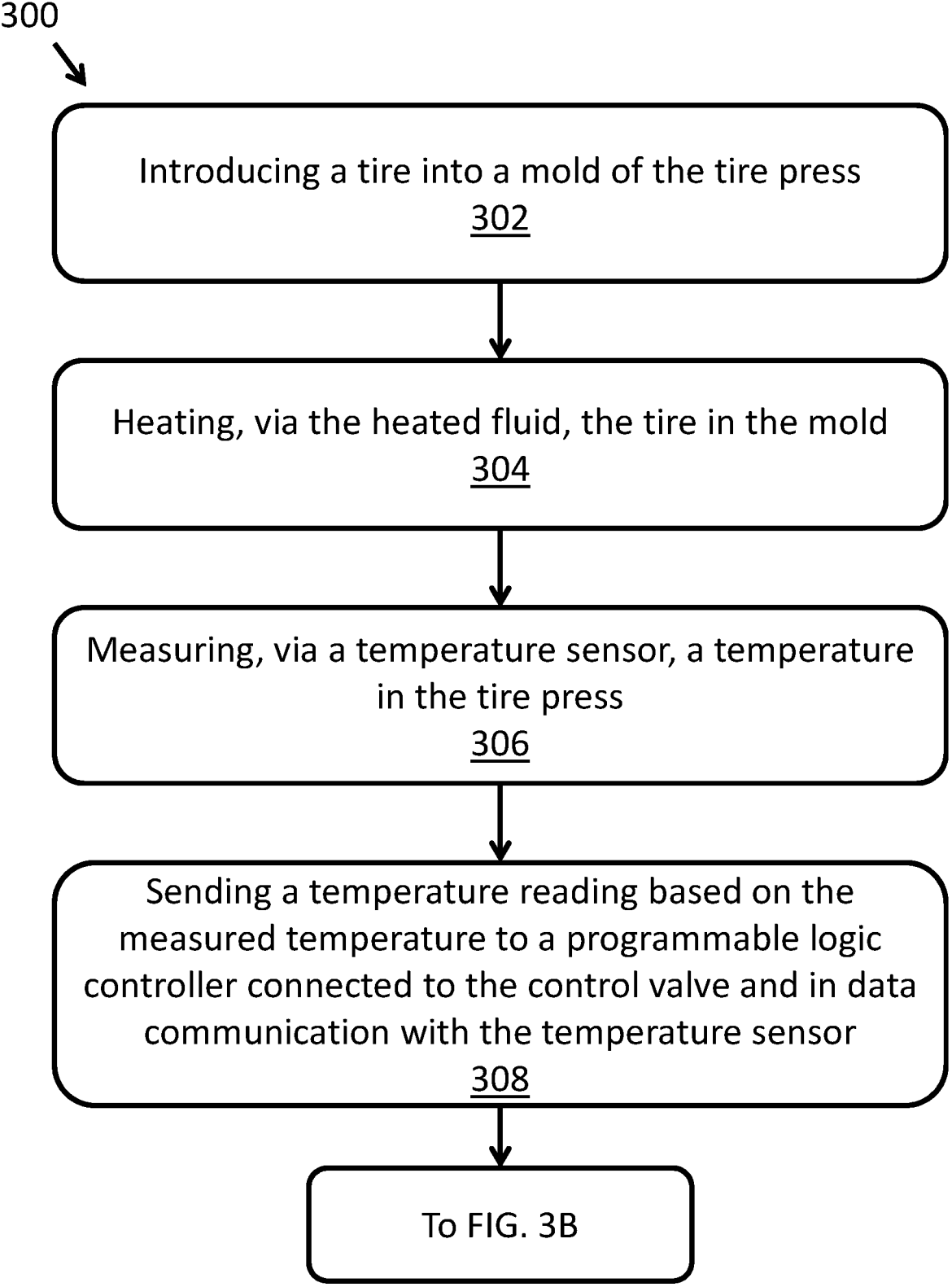
FIG. 3A is a flowchart illustrating one embodiment of a method for tire press temperature control.

FIGS. 3A-3B depict one embodiment of a method 300. The method 300 may include a method for controlling the temperature of a tire press 106. The method 300 may include introducing a tire into a mold 108 of the tire press 106 (step 302). The method 300 may include heating, via the heated fluid, the tire in the mold 108 (step 304). The method 300 may include measuring, via a temperature sensor 112, a temperature in the tire press 106 (step 306). The method 300 may include sending a temperature reading based on the measured temperature to a programmable logic controller 114 connected to a control valve 102 and in data communication with the temperature sensor 112 (step 308). The method 300 may include operating, based on the temperature reading, the control valve 102 during a first duty cycle of the tire press 106 to achieve a set point in the tire press 106 during the first duty cycle (step 310). The method 300 may include inputting, into a temperature control module 116, a performance parameter based on a position of the control valve 102 and the temperature reading (step 312). The method 300 may include determining, at the programmable logic controller 114, an output to operate the control valve 102 for a subsequent duty cycle based on an output of the temperature control module 116 (step 314).

In one embodiment, one or more of the components of the system 100 may carry out at least a portion of the steps 302-314 of the method 300. In one embodiment, introducing the tire into the mold 108 of the tire press 106 (step 302) may include a person or a machine disposing a green tire into the mold 108 of the tire press 106. The step 302 may include closing the tire press 106 and securing the tire press's 106 components for the tire curing process.

In some embodiments, heating, via the heated fluid, the tire in the mold 108 (step 304) may include causing the heated fluid to flow from the heated fluid source 104 to the one or more galleys 110(1)-(n) disposed in the tire press 106 or the mold 108 or bladder. The heated fluid may transfer heat to the tire in order to heat the tire and induce the tire curing process. The heated fluid may attempt to heat the tire press 106 to the set point. The amount of heated fluid that enters the tire press 106 may be in response to the position of the control valve 102.

In one or more embodiments, measuring, via the temperature sensor 112, the temperature in the tire press 106 (step 306) may include the temperature sensor 112 taking a temperature reading of the tire press 106. The temperature of the tire press 106 may include the temperature of the tire, the temperature of the mold 108 or bladder, the temperature in one or more galleys 110(1)-(n), the temperature of a platen, or the temperature in some other portion of the tire press 106. The temperature sensor 112 may measure the temperature of the tire press 106 autonomously or in response to receiving a signal or request (e.g., from the controller 114). The temperature sensor 112 may take multiple temperature readings during a period of time. In certain embodiments, the temperature sensor 112 may take multiple temperature readings and calculate an average temperature.

In one embodiment, sending the temperature reading based on the measured temperature to the programmable logic controller 114 connected to the control valve 102 and in data communication with the temperature sensor 112 (step 308) may include the temperature sensor 112 sending the temperature reading to the controller 114 over a data network. The temperature reading being based on the measured temperature may include the temperature reading being equal to the measured temperature. In some embodiments, the temperature sensor 112 may adjust the measured temperature value to generate the temperature reading (e.g., to correct for a known error, to calculate an average temperature, etc.). In one embodiment, the temperature readings may include multiple temperature readings, and the controller 114 may calculate a temperature reading based on the multiple temperature readings (e.g., calculating an average temperature reading).

In one embodiment, operating, based on the temperature reading, the control valve 102 during the first duty cycle of the tire press 106 to achieve the set point in the tire press 106 during the first duty cycle (step 310) may include the controller 114 sending a signal to the control valve 102 and, in response, the control valve 102 opening or closing. In one embodiment, the controller 114 may close the control valve 102 in response to the temperature reading indicating that the temperature of the tire press 106 is above the set point. The controller 114 may open the control valve 102 in response to the temperature reading indicating that the temperature of the tire press 106 is below the set point. The controller 114 may open or close the control valve 102 based on other data.

In some embodiments, the method 300 may include inputting, into the temperature control module 116, the performance parameter based on a position of the control valve 102 and the temperature reading (step 312). The controller 114 may input the performance parameter into the temperature control module 116. In one embodiment, the performance parameter may include the position of the control valve 102 and the temperature reading. In some embodiments, the performance parameter may include a time associated with the position of the control valve 102. The time may include a timestamp at the time the control valve 102 was at that position.

As an example, the temperature sensor 112 may take a temperature reading and send the temperature reading to the controller 114. The controller 114 may receive the temperature reading and determine the position of the control valve 102 when the temperature readings was taken. The controller 114 may generate the performance parameter, which may include the position of the control valve 102 and the temperature reading. The controller 114 may also include in the performance parameter the time.

In one embodiment, inputting, into the temperature control module 116, the performance parameter (step 312) may include inputting multiple performance parameters into the temperature control module 116. The one or more of the multiple performance parameters may include performance parameters from previous duty cycles. In some embodiments, the controller 114 may store previous performance parameters and may use some of them as input to the temperature control module 116.

The method 300 may include determining, at the programmable logic controller 114, the output to operate the control valve 102 for a subsequent duty cycle based on the output of the temperature control module 116 (step 314). The output to operate the control valve 102 may include a position of the control valve 102 (e.g., the position the control valve 102 should move to), a direction to move the control valve 102 (e.g., further open or further closed and by how much to move), or other position data. The output to operate the control valve 102 may include a time at which to move the position of the control valve 102 (e.g., a specific time at which the control valve's 102 position should be moved or a length of time that should elapse before moving the control valve 102).

In one embodiment, the temperature control module 116 may receive as input the current position of the control valve 102 and the current temperature reading. The current temperature reading may include the most recent temperature reading received from the temperature sensor 112. The input may further include previous control valve 102 positions and associated temperature readings from previous duty cycles. One or more of the current or previous control valve 102 positions or temperature readings may include a time associated with these pieces of data. The temperature control module 116 may use these inputs to determine the output to operate the control valve 102.

In some embodiments, the temperature control module 116 may include an AI model, and one or more of the inputs described above may be used as input to the AI model. The AI model may output the output to operate the control valve 102. In some embodiments, the AI model may include an ANN. The ANN may have been trained on a training data set that included multiple training records. A training record may have included values such as a position of the control valve 102, the temperature of the tire press 106, and the result of the training record may include the position that the control valve 102 should be moved to. Other types of AI models discussed above may receive similar input as training data.

In one embodiment, the controller 114 or the temperature control module 116 may use an error correction value in determining the output to operate the control valve 102. The controller 114 or the temperature control module 116 may calculate the error correction value. The error correction value may be based on an error correction value from one or more previous duty cycles. The error correction value may help correct for error outside of the loop used by the controller 114.

In some embodiments, some of the steps 302-314 may be adjusted to adapt the method 300 for the system 100 of the FIG. 2 where the heating element 202 is used. For example, step 304 may include heating, via the heating element 202 the tire in the mold 108 or heating the bladder. Step 310 may include operating the heating element 202 during the first duty cycle of the tire press 106. Step 314 may include determining an output to operate the heating element 202 for a subsequent duty cycle. Operating the heating element 202 may include inducing current in the heating element 202 in order to heat the heating element 202 to a certain temperature. The performance parameter of the step 312 may include a temperature of the heating element 202, an amount of current in the heating element 202, or some other similar value.

As can be seen from the present disclosure, the systems and methods disclosed herein may examine data from previous duty cycles, such as control valve 102 position and temperature of the tire press 106, and use that data to position the control valve 102 for one or more parts of the tire curing process. The systems and methods may use the data to adjust the temperature of the tire press 106 more efficiently and go beyond the conventional feedback loop that only uses the current control valve 102 position and the current temperature.

The systems and methods disclosed herein improve over current tire-curing technology because the consideration of the data from previous duty cycles, which is not found in conventional tire-curing processes, allows the systems and methods disclosed herein to maintain the tire press 106 temperature at the set point more efficiently. The use of the temperature control module 116 and AI models is also not found in conventional tire curing processes.

While the making and using of various embodiments of the present disclosure are discussed in detail herein, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatuses, systems, and methods described herein. Such equivalents are considered to be within the scope of this disclosure and may be covered by the claims.

Furthermore, the described features, structures, or characteristics of the disclosure may be combined in any suitable manner in one or more embodiments. In the description contained herein, numerous specific details are provided, such as examples of programming, software, user selections, hardware, hardware circuits, hardware chips, or the like, to provide understanding of embodiments of the disclosure. One skilled in the relevant art will recognize, however, that the disclosure may be practiced without one or more of the specific details, or with other methods, components, materials, apparatuses, devices, systems, and so forth. In other instances, well-known structures, materials, or operations may not be shown or described in detail to avoid obscuring aspects of the disclosure.

These features and advantages of the embodiments will become more fully apparent from the description and appended claims, or may be learned by the practice of embodiments as set forth herein. As will be appreciated by one skilled in the art, aspects of the present disclosure may be embodied as an apparatus, system, method, computer program product, or the like. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer-readable media having program code embodied thereon.

In some embodiments, a module may be implemented as a hardware circuit comprising custom (very large-scale integration) VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer-readable media.

The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium may include a portable computer diskette, a random access memory ("RAM"), a read-only memory ("ROM"), an erasable programmable read-only memory ("EPROM" or Flash memory), a static random access memory ("SRAM"), a hard disk drive ("HDD"), a solid state drive, a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations or block diagrams of methods, apparatuses, systems, algorithms, or computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that may be equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Thus, although there have been described particular embodiments of the present disclosure of new and useful systems and methods for tire press temperature control with artificial intelligence, it is not intended that such references be construed as limitations upon the scope of this disclosure.

What is claimed is:

1. A method for controlling a tire press, comprising:
   performing a tire curing process on an uncured tire, the tire curing process including:
   introducing the uncured tire into a mold of a tire press, wherein the tire press includes one or more galleys, and wherein each galley of the one or more galleys is in fluid communication with a source of heated fluid,
   heating, via the heated fluid, the uncured tire in the mold,
   measuring, via a temperature sensor, a temperature in the tire press,
   sending a temperature reading based on the measured temperature to a programmable logic controller connected to a control valve and in data communication with the temperature sensor,
   operating, based on the temperature reading, the control valve during a duty cycle of the tire press to achieve a set point in the tire press during the first-duty cycle, and
   inputting, into a temperature control module, a performance parameter based on a position of the control valve and the temperature reading; and determining, at the programmable logic controller, an output to operate the control valve for a subsequent duty cycle of a subsequent tire curing process for a subsequent uncured tire based on an output of the temperature control module from the duty cycle of the tire curing process.

2. The method of claim 1, wherein operating the control valve comprises at least one of:
further opening the control valve; or
further closing the control valve.

3. The method of claim 1, wherein the performance parameter further includes a time associated with the position of the control valve.

4. The method of claim 1, wherein determining the output to operate the control valve is further based on a current position of the control valve and a current temperature reading.

5. The method of claim 1, wherein determining the output to operate the control valve is further based on an error correction value.

6. The method of claim 1, wherein inputting, into the temperature control module, the performance parameter comprises inputting a plurality of performance parameters from previous duty cycles.

7. A method for controlling a tire press, comprising:
introducing a tire into a mold of a tire press, wherein the tire press includes one or more galleys, and wherein each galley of the one or more galleys is in fluid communication with a source of heated fluid;
heating, via the heated fluid, the tire in the mold;
measuring, via a temperature sensor, a temperature in the tire press;
sending a temperature reading based on the measured temperature to a programmable logic controller connected to a control valve and in data communication with the temperature sensor;
operating, based on the temperature reading, the control valve during a first duty cycle of the tire press to achieve a set point in the tire press during the first duty cycle;
inputting, into a temperature control module, a performance parameter based on a position of the control valve, the temperature reading, and a first time associated with each of the position of the control valve and the temperature reading; and
determining, at the programmable logic controller, an output to operate the control valve for a subsequent duty cycle based on an output of the temperature control module from the first duty cycle, wherein the output of the temperature control module includes a second time at which to move the position of the control valve.

8. The method of claim 7, wherein operating the control valve comprises at least one of:
further opening the control valve; or
further closing the control valve.

9. The method of claim 7, wherein determining the output to operate the control valve is further based on a current position of the control valve and a current temperature reading.

10. The method of claim 7, wherein determining the output to operate the control valve is further based on an error correction value.

11. The method of claim 7, wherein inputting, into the temperature control module, the performance parameter comprises inputting a plurality of performance parameters from previous duty cycles.

* * * * *